US009352750B2

(12) United States Patent
Johansson et al.

(10) Patent No.: US 9,352,750 B2
(45) Date of Patent: *May 31, 2016

(54) MODULE AND METHOD PERTAINING TO MODE CHOICE WHEN DETERMINING REFERENCE VALUES

(75) Inventors: Oskar Johansson, Stockholm (SE);
Maria Södergren, Segeltorp (SE);
Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 62 days.

This patent is subject to a terminal disclaimer.

(21) Appl. No.: 14/367,571

(22) PCT Filed: Dec. 22, 2011

(86) PCT No.: PCT/SE2011/051570
§ 371 (c)(1),
(2), (4) Date: Jun. 20, 2014

(87) PCT Pub. No.: WO2013/095235
PCT Pub. Date: Jun. 27, 2013

(65) Prior Publication Data
US 2015/0006055 A1   Jan. 1, 2015

(30) Foreign Application Priority Data

Dec. 22, 2011  (SE) .................................. 1151250-6

(51) Int. Cl.
*B60W 30/00*  (2006.01)
*B60W 40/105*  (2012.01)
(Continued)

(52) U.S. Cl.
CPC .............. *B60W 40/105* (2013.01); *B60K 31/00* (2013.01); *B60W 10/06* (2013.01); *B60W 10/11* (2013.01);
(Continued)

(58) Field of Classification Search
CPC ............ B60W 30/143; B60W 30/146; B60W 2540/04; B60W 2720/103; B60W 2510/0657; B60W 2710/0666; B60W 40/105; B60W 30/00; B60W 50/085; B60W 50/06; B60W 50/082
See application file for complete search history.

(56) References Cited

U.S. PATENT DOCUMENTS 5,839,534 A    11/1998  Chakraborty et al.
5,931,886 A    8/1999  Moroto et al.
(Continued)

FOREIGN PATENT DOCUMENTS

DE  10 2005 045 891     2/2007
DE  10 2009 030 784 A1  2/2010
(Continued)

OTHER PUBLICATIONS

International Search Report mailed Sep. 7, 2012 in corresponding PCT International Application No. PCT/SE2011/051569.
(Continued)

*Primary Examiner* — James Trammell
*Assistant Examiner* — Demetra Smith-Stewart
(74) *Attorney, Agent, or Firm* — Ostrolenk Faber LLP (57) ABSTRACT

A reference value for controlling a vehicle's speed is obtained by: receiving a choice from two selectable driving modes, each driving mode having a unique set of settings that influence the calculation of the reference value; making a first prediction, based on an engine torque $T_{ret}$ that retards the vehicle as compared with conventional cruise control, and a second prediction based on an engine torque $T_{acc}$ that accelerates the vehicle as compared with conventional cruise control; comparing the first and second predictions with a lower limit value and/or an upper limit value, which delineate a speed range within which the speed should be; and determining the reference value based on the mode choice and on at least one of the comparisons and said first prediction and second prediction of the speed along the horizon, such that the reference value is within the speed range.

20 Claims, 3 Drawing Sheets (51) Int. Cl.
*B60K 31/00* (2006.01)
*B60W 50/00* (2006.01)
*B60W 10/06* (2006.01)
*B60W 10/11* (2012.01)
*B60W 30/14* (2006.01)

(52) U.S. Cl.
CPC ......... *B60W 30/143* (2013.01); *B60W 50/0097* (2013.01); *B60K 2310/242* (2013.01); *B60W 2540/04* (2013.01); *B60W 2550/143* (2013.01); *B60W 2550/402* (2013.01); *B60W 2720/10* (2013.01); *Y02T 10/84* (2013.01)

(56) References Cited

U.S. PATENT DOCUMENTS

| | | |
|---|---|---|
| 6,076,036 A | 6/2000 | Price et al. |
| 6,098,005 A | 8/2000 | Tsukamoto et al. |
| 6,282,483 B1 | 8/2001 | Yano et al. |
| 6,782,961 B1 | 8/2004 | Ishikawa et al. |
| 6,990,401 B2 | 1/2006 | Neiss et al. |
| 7,103,460 B1 | 9/2006 | Breed |
| 7,315,804 B2 | 1/2008 | Sato et al. |
| 8,260,488 B2 | 9/2012 | Ishikawa et al. |
| 8,620,557 B2 | 12/2013 | Johansson et al. |
| 8,620,558 B2 | 12/2013 | Johansson et al. |
| 2003/0221886 A1 | 12/2003 | Petrie, Jr. et al. |
| 2004/0068359 A1 | 4/2004 | Neiss et al. |
| 2004/0149106 A1 | 8/2004 | Hess |
| 2004/0182652 A1 | 9/2004 | Ammon et al. |
| 2005/0096183 A1 | 5/2005 | Watanabe et al. |
| 2005/0273218 A1 | 12/2005 | Breed et al. |
| 2006/0106521 A1 | 5/2006 | Nasr et al. |
| 2007/0012013 A1 | 1/2007 | Strosser et al. |
| 2007/0192013 A1 | 8/2007 | Bando et al. |
| 2007/0208485 A1 | 9/2007 | Yamamura et al. |
| 2007/0265759 A1 | 11/2007 | Salinas et al. |
| 2008/0033621 A1 | 2/2008 | Nakamura et al. |
| 2009/0118918 A1 | 5/2009 | Heap et al. |
| 2009/0118920 A1 | 5/2009 | Heap et al. |
| 2010/0049400 A1 | 2/2010 | Duraiswamy et al. |
| 2010/0193616 A1 | 8/2010 | Berger et al. |
| 2010/0198450 A1 | 8/2010 | Shin |
| 2011/0106388 A1 | 5/2011 | Boeckenhoff et al. |
| 2011/0208405 A1 | 8/2011 | Tripathi et al. |
| 2011/0213540 A1 | 9/2011 | Tripathi et al. |
| 2011/0238255 A1* | 9/2011 | Sano ............... B60R 16/0236 701/31.4 |
| 2011/0276216 A1 | 11/2011 | Vaughan |
| 2012/0150411 A1 | 6/2012 | Oosawa et al. |
| 2012/0271494 A1* | 10/2012 | Kim .................. B60K 6/52 701/22 |
| 2012/0277940 A1 | 11/2012 | Kumar et al. |
| 2014/0277971 A1 | 9/2014 | Oshiro et al. |

FOREIGN PATENT DOCUMENTS

| | | |
|---|---|---|
| DE | 10 2008 035 944 A1 | 4/2010 |
| DE | 10 2010 003 428 A1 | 10/2011 |
| EP | 0 838 363 | 4/1998 |
| GB | 2480877 A | 12/2011 |
| JP | 2007-276542 A | 10/2007 |
| WO | WO 2006/107267 A1 | 10/2006 |
| WO | WO 2010/144028 A1 | 12/2010 |
| WO | WO 2010/144030 A1 | 12/2010 |
| WO | WO 2011/126430 A1 | 10/2011 |
| WO | WO 2011/126431 A1 | 10/2011 |
| WO | WO 2011/162705 A1 | 12/2011 |
| WO | WO 2011/162706 A1 | 12/2011 |

OTHER PUBLICATIONS

International Search Report mailed Sep. 7, 2012 in corresponding PCT International Application No. PCT/SE2011/051578.
International Search Report mailed Sep. 7, 2012 in corresponding PCT International Application No. PCT/SE2011/051575.
International Search Report dated Sep. 13, 2012 issued in corresponding International patent application No. PCT/SE2011/051577.
International Search Report mailed Sep. 6, 2012 in corresponding PCT International Application No. PCT/SE2011/051568.
International Search Report mailed Sep. 11, 2012 in corresponding PCT International Application No. PCT/SE2011/051585.
Erik Hellström, "Explicit use of road topography for model predictive cruise control in heavy trucks," Master's thesis performed in Vehicular Systems, ISRN: LiTH-ISY-EX—05/3660—SE, Linköping, Feb. 21, 2005.
Maria Ivarsson, "Fuel Optimal Powertrain Control for Heavy Trucks Utilizing Look Ahead," Linköping Studies in Science and Technology, Thesis No. 1400, ISBN 978-917393-637-8, SE, Linköping, 2009.
Office Action mailed Mar. 16, 2015 in U.S. Appl. No. 14/364,796.
Office Action mailed Apr. 21, 2015 in U.S. Appl. No. 14/365,361.
Office Action mailed May 6, 2015 in U.S. Appl. No. 14/367,509.
Notice of Allowance mailed Apr. 13, 2015 in U.S. Appl. No. 14/367,465.
Notice of Allowance mailed Apr. 24, 2015 in U.S. Appl. No. 14/365,331.
International Search Report dated Sep. 14, 2012 issued in corresponding International patent application No. PCT/SE2011/051570.
Hellström, E. et al., "Look-ahead control for heavy trucks to minimize trip time and fuel consumption", Control Engineering Practice, 2009, vol. 17, No. 2, pp. 245-254, ISSN 0967-0661.
Sangjun, P. "Predictive eco-cruise control: Algorithm and potential benefits", Integrated and Sustainable Transprotation System (FISTS), 2011 IEEE Forum, Jun. 29, 2011, ISBN 978-1-4577-0990-6, pp. 394-399.

\* cited by examiner

MODULE AND METHOD PERTAINING TO MODE CHOICE WHEN DETERMINING REFERENCE VALUES

CROSS-REFERENCE TO RELATED APPLICATIONS

The present application is a 35 U.S.C. §§371 national phase conversion of PCT/SE2011/051570, filed Dec. 22, 2011, which claims priority of Swedish Application No. 1151250-6, filed Dec. 22, 2011. The contents of both applications are incorporated by reference herein. The PCT International Application was published in the English language.

FIELD OF THE INVENTION

The present invention relates to a module and a method for determining at least one reference value for a vehicle's control system according to the present disclosure.

BACKGROUND TO THE INVENTION

Cruise control is now usual in motor vehicles, e.g. cars, trucks and buses. An object of cruise control is to achieve a uniform predetermined speed. This is done either by adjusting the engine torque to avoid retardation, or by applying braking action on downhill runs where the vehicle is accelerated by its own weight. A more general object of cruise control is to provide convenient driving and better comfort for the vehicle's driver. A driver of a vehicle equipped with cruise control usually chooses a set speed $v_{set}$ as the speed he/she wishes the vehicle to maintain on level roads. A cruise control then supplies an engine system of the vehicle with a reference speed $v_{ref}$ used for control of the engine. The set speed $v_{set}$ may thus be regarded as an input signal to the cruise control, whereas the reference speed $v_{ref}$ may be regarded as an output signal from the cruise control and is used for control of the engine.

Today's traditional cruise control (CC) maintains a constant reference speed $v_{ref}$ usually set by the vehicle's driver in the form of a set speed $v_{set}$ which is thus here a desired speed chosen for example by him/her, and for today's conventional cruise controls the reference speed is constant and equal to the set speed, i.e. $v_{ref}=v_{set}$. The value of the reference speed $v_{ref}$ changes only when adjusted by the driver while the vehicle is in motion. The reference speed $v_{ref}$ is then sent to a control system which controls the vehicle so that its speed corresponds when possible to the reference speed $v_{ref}$. If the vehicle is equipped with an automatic gearchange system, the gears may be changed by that system on the basis of the reference speed $v_{ref}$ to enable the vehicle to maintain the reference speed $v_{ref}$, i.e. to enable it to maintain the desired set speed $v_{set}$.

In hilly terrain, the cruise control system will try to maintain the set speed vset uphill and downhill. This may result inter alia in the vehicle accelerating over the crest of a hill and into a subsequent downgrade. It will then need to be braked to avoid exceeding the set speed $v_{set}$ or will reach a speed $v_{kfb}$ at which the constant speed brake is activated, which is a fuel-expensive way of driving the vehicle. It may also need to be braked downhill to avoid exceeding the set speed $v_{set}$ or the constant speed brake's activation speed $v_{kfb}$ in cases where the vehicle does not accelerate over the crest of the hill.

To reduce fuel consumption, especially on hilly roads, economical cruise controls such as Scania's Ecocruise® have been developed. This cruise control tries to estimate the vehicle's current running resistance and also has information about its historical running resistance. The economical cruise control may also be provided with map data comprising topographical information. The vehicle is then located on the map, e.g. by means of GPS, and the running resistance along the road ahead is estimated. The vehicle's reference speed $v_{ref}$ can thus be optimised for different types of roads in order to save fuel, in which case the reference speed $v_{ref}$ may differ from the set speed $v_{set}$. This specification refers to cruise controls which allow the reference speed $v_{ref}$ to differ from the set speed $v_{set}$ chosen by the driver, i.e. reference speed-regulating cruise controls.

An example of a further development of an economical cruise control is a "look ahead" cruise control (LACC), a strategic form of cruise control which uses knowledge of sections of road ahead, i.e. knowledge of the nature of the road ahead, to determine the reference speed $v_{ref}$. LACC is thus an example of a reference speed-regulating cruise control whereby the reference speed $v_{ref}$ is allowed, within a certain range, to differ from the set speed $v_{set}$ chosen by the driver, in order to achieve more fuel saving.

Knowledge of the road section ahead may for example comprise information about prevailing topology, road curvature, traffic situation, roadworks, traffic density and state of road. It may further comprise a speed limit on the section ahead, and a traffic sign beside the road. Such knowledge is for example available from location information, e.g. GPS (global positioning system) information, map information and/or topographical map information, weather reports, information communicated between vehicles and information provided by radio. All this knowledge may be used in a variety of ways. For example, information about a speed limit on the road ahead may be used to achieve fuel efficiency by lowering the vehicle's speed before reaching a lower speed limit. Similarly, knowledge of a road sign which indicates for example a roundabout or intersection ahead may also be used to achieve fuel efficiency by braking before the vehicle reaches the roundabout or intersection.

An LACC cruise control does for example make it possible, before a steep upgrade, for the reference speed $v_{ref}$ to be raised to a level above the set speed $v_{set}$, since the vehicle will be expected to lose speed on such a climb owing to high train weight relative to engine performance. Similarly, before a steep downgrade, the LACC cruise control makes it possible for the reference speed $v_{ref}$ to be lowered to a level below the set speed $v_{set}$, since the vehicle will be expected (predicted) to accelerate on such a downgrade owing to its high train weight. The concept here is that reducing the speed at which the vehicle begins the downhill run makes it possible to reduce the energy braked away and/or the air resistance losses (as reflected in the amount of fuel injected before the downgrade). The LACC cruise control may thus reduce fuel consumption without substantially affecting journey time.

In hilly terrain, a reference speed-regulating cruise control, unlike a conventional cruise control, can thus actively vary the vehicle's speed. For example, the vehicle's speed will be reduced before a steep downgrade to enable it to utilise more of the cost-free energy provided by the downgrade, instead of braking it away. The speed may also be increased before a steep climb to prevent the vehicle losing too much speed and time.

Different drivers often have different needs and wishes with regard to how cruise control should behave to specifically suit them and their needs, e.g. a driver may not always be interested in and willing to focus primarily on saving fuel but may sometimes wish instead to achieve shorter journey time.

EP0838363 describes a method and device for controlling the speed of a vehicle by using conventional or adaptive cruise control. The driver can change the way the vehicle behaves by altering the cruise control's limit values with regard to how much the vehicle is allowed to accelerate or decelerate, and thus switch between a sport mode and a comfort mode. This solution applies only to conventional cruise controls and adaptive cruise controls which have no knowledge of the road ahead. These solutions are therefore not optimum, since imminent hills, bends, road signs etc. cannot be foreseen and therefore cannot be catered for in advance. Moreover, the driver's scope for setting the cruise control's functions is very limited, since there are only two modes to choose from.

SUMMARY OF THE DISCLOSURE

An object of the present invention is to propose an improved module and method for controlling a vehicle's speed which enhance driver acceptance of the vehicle's cruise control and which in particular cater for running resistance on road sections ahead.

According to an aspect of the present invention, the above object is at least partly achieved by use of the aforesaid module, which is characterised by being arranged to:
choose from at least two selectable driving modes each comprising a unique set of settings which influence the calculation of the at least one reference value;
make a first prediction $v_{pred\_Tnew\_ret}$ and a second prediction $V_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control;
compare said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be; and
determine at least one reference value based on the chosen driving mode and on at least one of said respective comparisons and said first prediction $v_{pred\_Tnew\_ret}$ and said second prediction $v_{pred\_Tnew\_acc}$ of the vehicle speed along the horizon so that the at least one reference value is within a range bounded by the lower and upper limit values $v_{min}$ and $V_{max}$.

According to an aspect of the present invention, the above object is at least partly achieved by use of the aforesaid method, which is characterised by:
choosing from at least two selectable driving modes each comprising a unique set of settings which influence the calculation of the at least one reference value;
making a first prediction $v_{pred\_Tnew\_ret}$ and a second prediction $v_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control;
comparing said respective first prediction $V_{pred\_Tnew\_ret}$ and second prediction $V_{pred\_Tnew\_acc}$ of the vehicle speed with a lower limit value $v_{min}$ and/or an upper limit value $v_{max}$ which delineate a range within which the vehicle's speed should be; and
determining at least one reference value based on the chosen driving mode and on at least one of said respective comparisons and said first prediction $v_{pred\_Tnew\_ret}$ and second prediction $v_{pred\_Tnew\_acc}$ of the vehicle speed along the horizon so that the at least one reference value is within a range bounded by the lower and upper limit values $v_{min}$ and $V_{max}$.

The at least one reference value is here preferably a reference speed $v_{ref}$, a reference torque $T_{ref}$ or a reference engine speed $\omega_{ref}$.

The fact that the driver can influence the way the vehicle's speed is maintained by choosing between different driving modes enables him/her to match the vehicle's behaviour with prevailing traffic density and road type or with his/her temperament and/or driving style, thereby enhancing driver acceptance of using the system. It is for example sometimes more desirable to have shorter journey time than to drive in a fuel-economising way, in which case the driver can, by changing driving mode, cause the vehicle to be regulated on the basis of the desire for shorter journey time.

For example, in a situation where the traffic density increases, it is easy for the driver to switch from an economical mode which may cause great variations in the vehicle's speed to a normal mode to avoid causing irritation to other road users by large variations in his/her vehicle's speed. A normal mode is here defined as more like a traditional cruise control than an economical mode and results in a more acceptable mode of driving in dense traffic. Changes of driving mode may involve altering permissible speed ranges, gearshift points for the automatic gearchange system, permissible acceleration levels etc.

Since a driving mode comprises a number of settings all regulated by a choice of mode which is easy for the driver to effect, the present invention makes it easier for him/her to set the vehicle with a view to achieving a certain driving effect. This means that a mode choice is all that the driver has to do, instead of effecting individually each of the settings covered by the mode. It also has the effect of improving traffic safety in that the driver's concentration can now be focused on driving the vehicle.

In other words, the present invention makes setting the cruise control's parameters very user-friendly. By one or two very simple inputs the driver can now determine how the vehicle's speed is to be controlled.

Applying a method which defines the limits for the magnitude of the reference value, i.e. which defines the lower and upper lower limit values $v_{min}$ and $v_{max}$ which delineate the range within which the vehicle's speed should be, results in a predictable and robust way of quickly calculating reference values for use by one or more of the vehicle's control systems.

According to an embodiment of the invention, the lower and upper limit values $v_{min}$ and $v_{max}$ are defined on the basis of the choice of driving mode. This has a direct effect on how the at least one reference value is determined.

According to an embodiment of the invention the mode choice defines a weighting parameter $\beta$ which is then used in evaluating one or more cost functions when determining said at least one reference value, and has a direct effect on how the at least one reference value is determined.

According to an embodiment of the invention, the lower and upper limit values $v_{min}$ and $v_{max}$ and the weighting parameter $\beta$ are defined on the basis on the choice of driving mode.

Preferred embodiments are described herein.

BRIEF DESCRIPTION OF THE ATTACHED DRAWINGS

The invention is described below reference to the attached drawings, in which.

DETAILED DESCRIPTION OF PREFERRED EMBODIMENTS OF THE INVENTION

Figure 1:
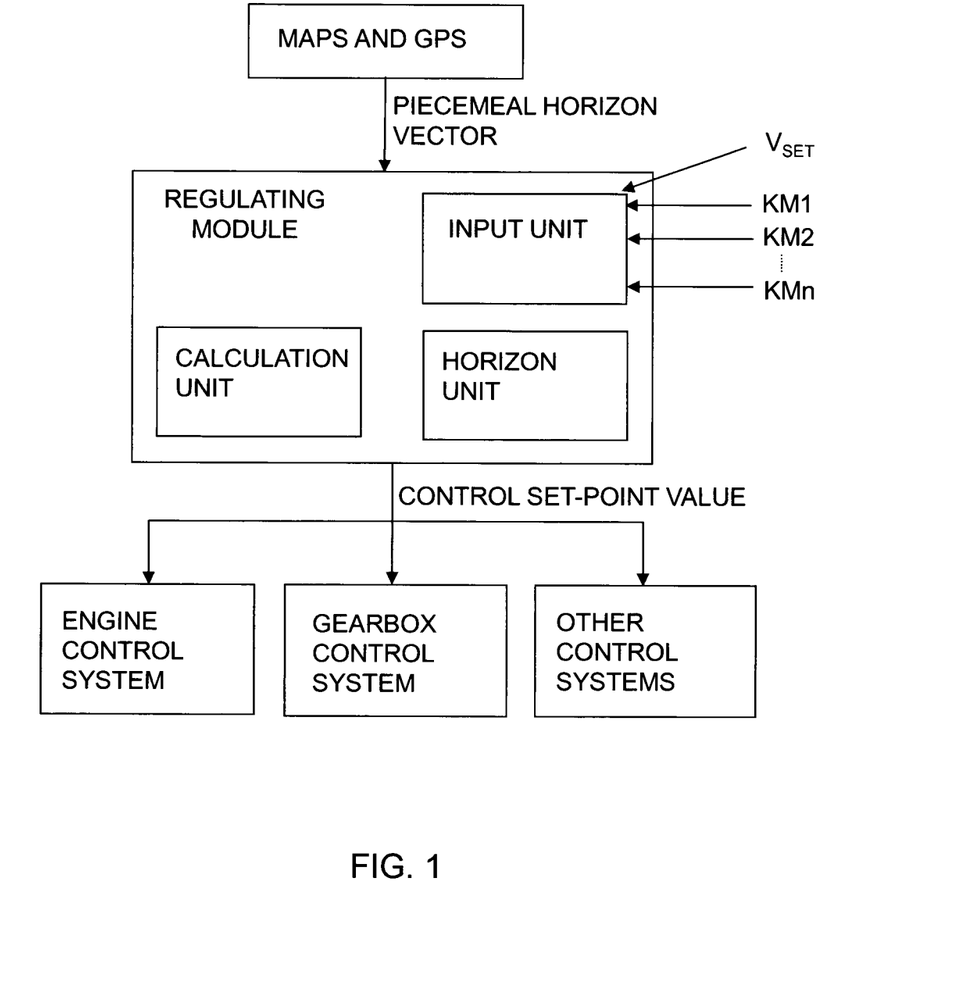
FIG. 1 depicts the module's functional engagement in the vehicle according to an embodiment of the invention.

FIG. 1 depicts a module for controlling a vehicle's speed according to an aspect of the invention. The module comprises an input unit adapted to receiving a desired speed, i.e. a set speed $v_{set}$, for the vehicle. The driver may for example set a speed $v_{set}$ which he/she wishes the vehicle to maintain. The module comprises also a mode choice unit which may be a part of the input unit. This mode choice unit is adapted to choosing a driving mode. The choice of driving mode may be based on input of driving modes $KM_1, KM_2, \ldots KM_n$ via the input unit, as depicted in FIG. 1.

The input unit may also be adapted to receiving input values for the lower limit value $v_{min}$ and the upper limit value $v_{max}$ (not depicted in the diagram). The module comprises also a horizon unit adapted to determining a horizon H for the itinerary by means of map data and location data. The horizon H is made up of route segments with at least one characteristic for each segment. A possible example of the characteristics of route segments is their gradient α, in radians.

The description of the present invention states that GPS (global positioning system) is used to determine location data for the vehicle, but specialists will appreciate that other kinds of global or regional positioning systems are conceivable to provide these data.

Such positioning systems might for example use radio receivers to determine the vehicle's location. The vehicle might also use sensors to scan the surroundings and thereby determine its location.

FIG. 1 illustrates how the module is provided with information about the itinerary from maps (map data) and GPS (location data). The itinerary is sent to the module bit by bit, e.g. via CAN (controller area network) bus. The module may be separate from or be part of the one or more control systems which are to use reference values for regulating. An example of such a control system is the vehicle's engine control system. The control system may also be any other appropriate control systems of the vehicle, e.g. cruise control, gearbox control system or other control system. For example, a horizon is put together for each control system, since the control systems regulate on different parameters. Alternatively, the unit which handles maps and positioning systems may also be part of a system which is to use reference values for regulating. In the module, the bits of the itinerary are then put together in a horizon unit to construct a horizon and are processed by the processor unit to create an internal horizon on which the control system can regulate. The horizon is then continually supplemented by new bits of itinerary from the unit with GPS and map data, to maintain a desired length of horizon. The horizon is thus updated continuously when the vehicle is in motion.

CAN is a serial bus system specially developed for use in vehicles. The CAN data bus makes digital data exchange possible between sensors, regulating components, actuators, control devices etc., and provides assurance that two or more control devices can have access to the signals from a given sensor in order to use them to control components connected to them. Each of the connections between the units illustrated in FIG. 1 may take the form of one or more from among a cable, a data bus, e.g. a CAN (controller area network) bus, an MOST (media orientated systems transport) bus, or some other bus configuration, or a wireless connection.

The module is arranged to use a mode choice unit for choosing from at least two selectable selectable driving modes each comprising a unique set of settings which influence the calculation of the at least one reference value. The choice may for example be based on input from the driver but may also be determined in some other way.

The module comprises also a calculation unit adapted to making a first prediction $v_{pred\_Tnew\_ret}$ and a second prediction $V_{pred\_Tnew\_acc}$ of a vehicle speed along a horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control.

The module is further arranged to compare said respective first prediction $v_{pred\_Tnew\_ret}$ and second prediction $v_{pred\_Tnew\_acc}$ of the vehicle speed with a lower limit value $v_{min}$ and/or an upper limit value $v_{max}$ which delineate a range within which the vehicle's speed should be.

Thereafter the module determines at least one reference value which indicates how the vehicle's speed is to be influenced on the basis of the chosen driving mode and at least one of said respective comparisons, said first prediction $v_{pred\_Tnew\_ret}$ and said and second prediction $v_{pred\_Tnew\_acc}$ of the vehicle speed along the horizon. According to the present invention, the at least one reference value is so determined that it is within the range bounded by the lower and upper limit values $v_{min}$ and $v_{max}$.

The module is further arranged to provide, e.g. by sending, to a control system of the vehicle said at least one reference value on which the vehicle is regulated. How the predictions of the speeds are made will be explained in more detail below.

How the choice of driving mode is used in determining the at least one reference value and how inter alia the lower and upper limit values $v_{min}$ and $v_{max}$ are determined, according to various embodiments of the invention will be described in more detail below.

The module is further arranged to supply, e.g. by sending, to a control system of the vehicle said at least one reference value on which the vehicle is regulated.

The module and/or the calculation unit comprise at least a processor and a memory unit which are adapted to making all the calculations, predictions and comparisons of the method according to the invention. Processor means here a processor or microcomputer, e.g. a circuit for digital signal processing (digital signal processor, DSP), or a circuit with a predetermined specific function (application specific integrated circuit, ASIC). The calculation unit is connected to a memory unit which provides it with, for example, the stored programme code and/or stored data which the calculation unit needs to enable it to do calculations. The calculation unit is also adapted to storing partial or final results of calculations in the memory unit.

The method for control of vehicle speed according to the present invention and its various embodiments may also be implemented in a computer programme which, when executed in a computer, e.g. the aforesaid processor, causes the computer to apply the method. The computer programme usually takes the form of a computer programme product stored on a digital storage medium, and is contained in a computer programme product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

Figure 2:
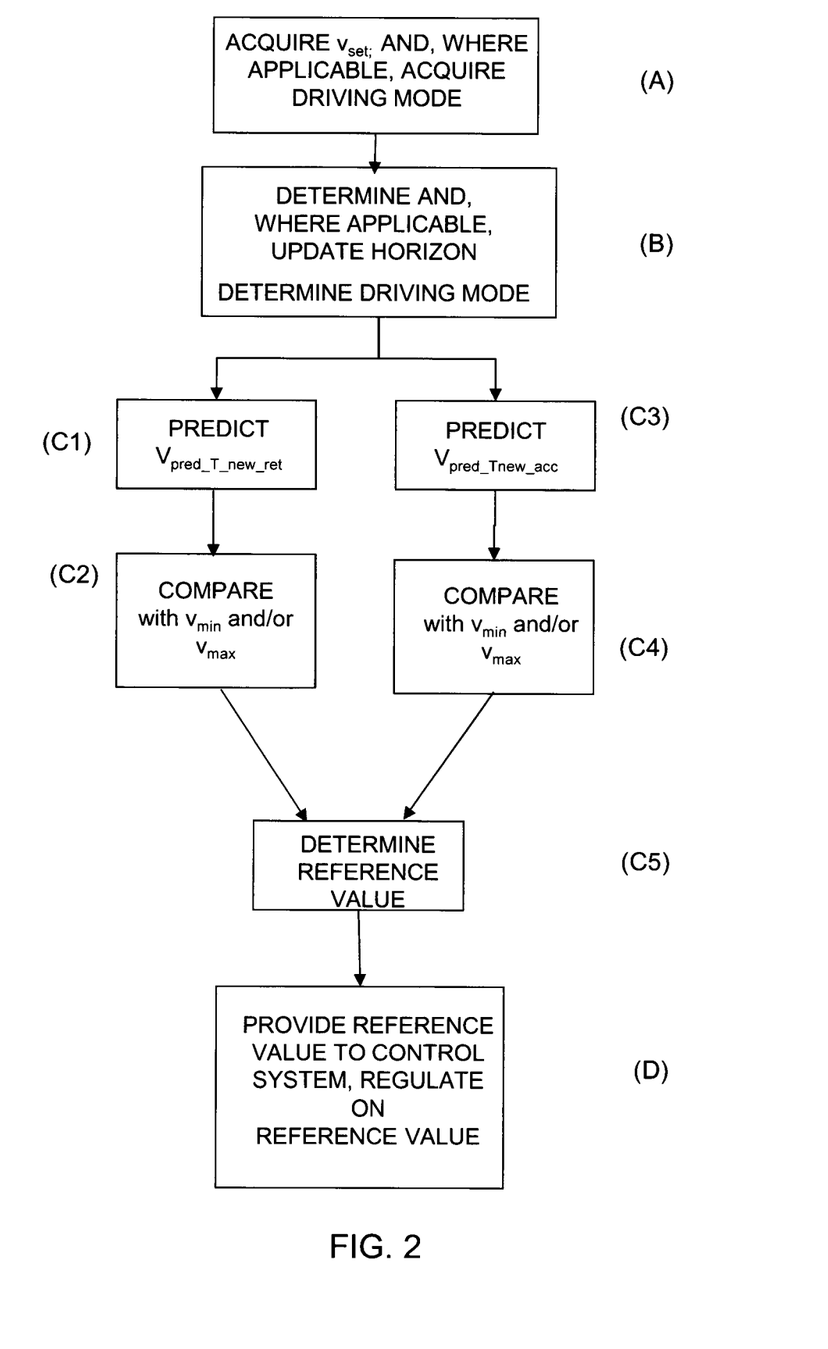
FIG. 2 is a flowchart for the steps which the module is arranged to perform according to an embodiment of the invention.

FIG. 2 is a flowchart for a method for controlling the vehicle's speed according to an embodiment of the invention, comprising determining the at least one reference value according to the invention. The method comprises a first step A) of acquiring $v_{set}$ as a desired set speed for the vehicle to maintain. Where applicable, this first step A) may also comprise acquiring a chosen driving mode $KM_1, KM_2, \ldots KM_n$ via the input unit.

As a second step B), a horizon for the itinerary is determined by means of map data and location data comprising route segments with at least one characteristic for each segment, and the driving mode to be applied in the simulations. The choice of driving mode may here be based on driver input of chosen driving modes $KM_1, KM_2, \ldots KM_n$ but may also be made on the basis of other parameters. Also the second lower and upper limit values $v_{min}$ and $v_{max}$, so that the set speed $v_{set}$ can be determined in this second step B). The lower and upper limit values $v_{min}$ and $v_{max}$ may here be determined on the basis of driver input and/or be determined automatically on the basis of parameters such as time gaps to vehicles in front. This will be described in more detail below.

The following steps are then performed:

C1) Making a first prediction $V_{pred\_Tnew\_ret}$ of a vehicle speed along a horizon on the basis of an engine torque $T_{ret}$ which retards the vehicle as compared with a conventional cruise control.

C2) Comparing said first prediction $v_{pred\_Tnew\_ret}$ of the vehicle speed with a lower limit value $v_{min}$ and/or an upper limit value $v_{max}$ which delineate a range within which the vehicle's speed should be. Said first prediction thus does not have to be compared here both with the lower limit value $v_{min}$ and with the upper limit value $v_{max}$.

C3) Making a second prediction $v_{pred\_Tnew\_acc}$ of a vehicle speed along a horizon on the basis of an engine torque $T_{acc}$ which accelerates the vehicle as compared with a conventional cruise control.

C4) Comparing said second prediction $v_{pred\_Tnew\_acc}$ of the vehicle speed with a lower limit value $v_{min}$ and/or an upper limit value $v_{max}$ which delineate a range within which the vehicle's speed should be. Said second prediction thus does not have to be compared here both with the lower limit value $v_{min}$ and with the upper limit value $v_{max}$.

C5) Determining at least one reference value based on the mode choice and on at least one of said respective comparisons and said first prediction $v_{pred\_Tnew\_ret}$ and second prediction $v_{pred\_Tnew\_acc}$ of the vehicle speed along the horizon.

As a further step D) said at least one reference value is then supplied, e.g. by being sent via a CAN bus, to a control system of the vehicle in which it is used to regulate the vehicle's speed according to said at least one reference value.

Figure 3:
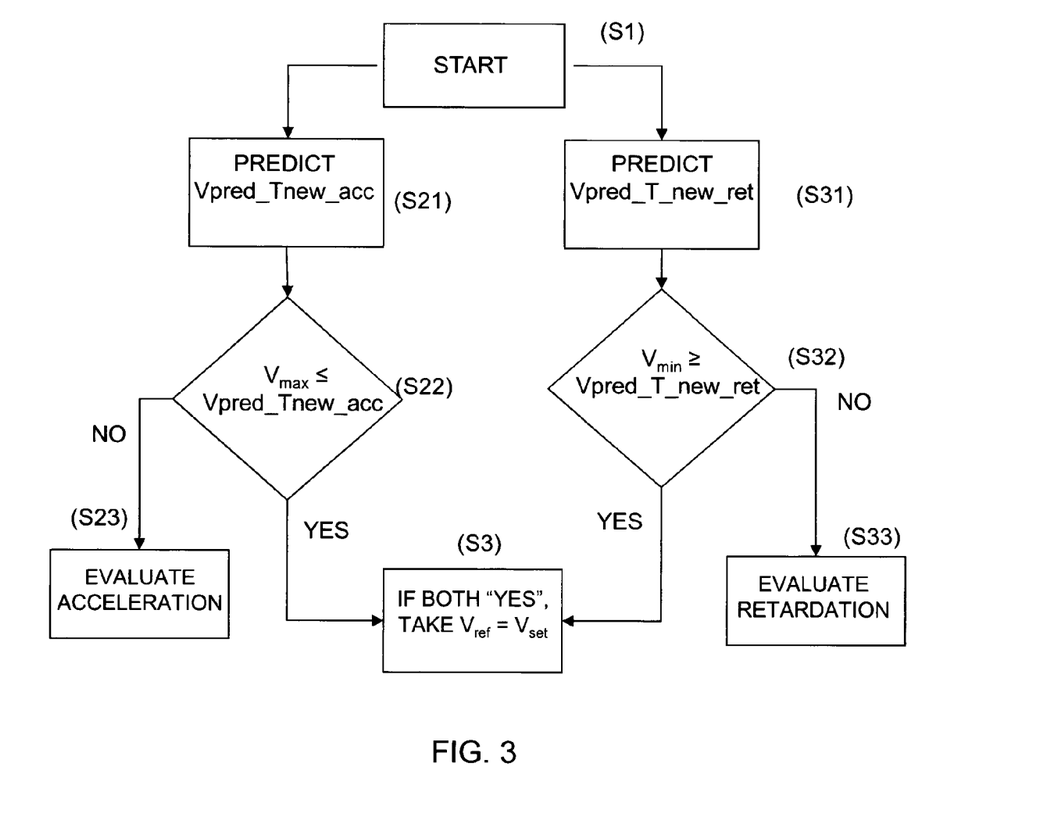
FIG. 3 is a flowchart according to an embodiment of the invention.

The flowchart in FIG. 3 illustrates how at the least one reference value is determined according to an embodiment of the invention. It shows the method starting at step S1. This is followed at steps 21 and 31 respectively by a first prediction $v_{pred\_Tnew\_ret}$ and a second prediction $v_{pred\_Tnew\_acc}$ of vehicle speed along the horizon, said first prediction based on an engine torque $T_{ret}$ which retards the vehicle as compared with a conventional cruise control, and said second prediction based on an engine torque $T_{acc}$ which accelerates the vehicle as compared with a conventional cruise control.

According to an embodiment of the invention, said first prediction $v_{pred\_Tnew\_ret}$ and second prediction $v_{pred\_Tnew\_acc}$ of a vehicle speed along the horizon are made in parallel, i.e. at substantially the same time in different branches of the flowchart for the method as illustrated in FIG. 3. According to another embodiment of the invention, said first prediction $v_{pred\_Tnew\_ret}$ and second prediction $v_{pred\_Tnew\_acc}$ of a vehicle speed along the horizon are made sequentially, i.e. one after another.

This is followed by the respective steps S22 and S32 of comparing said respective first prediction $v_{pred\_Tnew\_ret}$ and second prediction $v_{pred\_Tnew\_acc}$ of the vehicle speed with a lower value $v_{min}$ and/or an upper limit value $v_{max}$ which delineate a range within which the vehicle's speed should be. These comparisons take place at steps S22 and S32 in FIG. 3.

According to an embodiment, the respective comparisons of said first prediction $v_{pred\_Tnew\_ret}$ and second prediction $v_{pred\_Tnew\_acc}$ of the vehicle speed with a lower limit value $v_{min}$ and/or an upper limit value $v_{max}$ take place substantially in parallel at the respective steps S22 and S32, as depicted in FIG. 3. According to another embodiment, the comparisons of said first prediction $v_{pred\_Tnew\_ret}$ and second prediction $v_{pred\_Tnew\_acc}$ of the vehicle speed with a lower limit value $v_{min}$ and/or an upper limit value $v_{max}$ take place sequentially. According to the present invention the lower and upper limit values $v_{min}$ and $v_{max}$ are here such that the set speed $v_{set}$ is within the range bounded by them.

According to an embodiment of the invention, rules are applied for determining which at least one reference value the vehicle is to be regulated on. A set of rules is therefore used here to determine the value of the at least one reference value.

According to an embodiment, such a rule is that the at least one reference value, which here is the reference speed $v_{ref}$, is determined to a value which represents the set speed $v_{set}$ if at the same time said first prediction $v_{pred\_Tnew\_ret}$ of the vehicle speed is below the lower limit value $v_{min}$ and said second prediction $v_{pred\_Tnew\_acc}$ of the vehicle speed is above the upper limit value $v_{max}$. This is illustrated at step S3 in FIG. 3, which the method moves on to if the result of both the S22 and the S32 comparisons is "YES".

If on the contrary said first prediction $v_{pred\_Tnew\_ret}$ of the vehicle speed is not below the lower limit value $v_{min}$, the method moves on to step S33, in which the retardation (the lowering of the speed) is evaluated.

At step S33, according to an embodiment, the reference speed $v_{ref}$ is determined to a value which represents said first predicted vehicle speed $v_{pred\_Tnew\_ret}$ if a minimum value for said first predicted speed is equal to or above the lower limit value $v_{min}$ and if also a maximum value for said first predicted speed is equal to or above a further upper limit value $v_{max2}$ which is related to a set speed $v_{set}$. According to an embodiment, the further upper limit value $v_{max2}$ corresponds to the set speed plus a constant $c_1$, i.e. $v_{max2}=v_{set}+c_1$. According to another embodiment, the further upper limit value $v_{max2}$ corresponds to a factor $c_1$ multiplied by the set speed, i.e. $v_{max2}=v_{set}*c_1$. This factor $c_1$ may for example have the value 1.02, meaning that the further upper limit value $v_{max2}$ is 2% higher than the set speed $v_{set}$.

At step S33, according to an embodiment, the reference speed $v_{ref}$ is determined to a value which corresponds to the set speed $v_{set}$ if said first predicted vehicle speed $v_{pred\_Tnew\_ret}$ is below the lower limit value $v_{min}$ and/or below the further upper limit value $v_{max2}$.

At step S33, according to an embodiment, the reference speed $v_{ref}$ is determined to a value which corresponds to the lower limit value $v_{min}$ if a smallest value for said first predicted vehicle speed $v_{pred\_Tnew\_ret}$ is above or equal to the lower limit value $v_{min}$ and if a largest value for said first predicted speed is above or equal to the further upper limit value $v_{max2}$. This is illustrated schematically in FIG. 3.

If on the contrary said second prediction $v_{pred\_Tnew\_ret}$ of the vehicle speed is not below the lower limit value $v_{min}$, the method moves on to step S23, in which the acceleration (the raising of the speed) is evaluated.

At step S23, according to an embodiment, the reference speed $v_{ref}$ is determined to a value which represents said second predicted vehicle speed $v_{pred\_Tnew\_ret}$ if a maximum value for said second predicted speed is equal to or below the upper limit value $v_{max}$ and if also a minimum value for said second predicted speed is equal to or below a further lower limit value $v_{min2}$ which is related to a set speed. According to an embodiment, the further lower limit value $v_{min2}$ corresponds to the set speed $v_{set}$ minus a constant $c_2$, i.e. $v_{min2}=v_{set}-c_2$. According to another embodiment, the further lower limit value $v_{min2}$ corresponds to a factor $c_2$ multiplied by the set speed $v_{set}$, i.e. $v_{min2}=v_{set}*c_2$. This factor $c_2$ may for example have the value 0.98, meaning that the further upper limit value $v_{max2}$ is 2% lower than the set speed $v_{set}$.

At step S23, according to an embodiment, the reference speed $v_{ref}$ is determined to a value which corresponds to set speed $v_{set}$ if said second predicted vehicle speed $v_{pred\_Tnew\_ret}$ is above the upper limit value $v_{max}$ and/or above the further lower limit value $v_{min2}$.

At step S23, according to an embodiment, the reference speed $v_{ref}$ is determined to a value which corresponds to the upper limit value $v_{max}$ if a largest value for the second predicted vehicle speed $v_{pred\_Tnew\_ret}$ is below or equal to the upper limit value $v_{max}$ and if a smallest value for second predicted speed is smaller than or equal to the further lower limit value $v_{min2}$. According to an embodiment of the invention, the reference speed $v_{ref}$ may here also be ramped up towards a value which corresponds to the further upper limit value $v_{max2}$.

The method according to the present invention results in a constant and predetermined processor load when determining this at least one reference value, so the driver can easily set how these reference values are determined by single inputs in the system. A single mode choice directly results, according to the invention, in a particular behaviour of the vehicle, simplifying the settings for the driver and also resulting in a vehicle behaviour desired by him/her. Use of the system will thus be increased through greater acceptance by drivers.

The set speed $v_{set}$ is thus the driver's input signal related to a desired cruise control speed, and the at least one reference value is the value on which the vehicle is regulated. The at least one reference value is preferably a reference speed $v_{ref}$, a reference torque $T_{ref}$ or a reference engine speed $\omega_{ref}$.

The reference speed $v_{ref}$ is imparted to the speed regulator of the engine control unit. In traditional cruise control, as mentioned above, the reference speed $v_{ref}$ is equal to the set speed $v_{set}$, i.e. $v_{ref}=v_{set}$. The speed regulator then controls the vehicle's speed on the basis of the reference speed $v_{ref}$ by demanding necessary torque from the engine's torque regulator. According to the embodiment in which the at least one reference value is a reference torque $T_{ref}$, it may be sent directly to the engine's torque regulator. In the embodiment where the at least one reference value is a reference engine speed $\omega_{ref}$, it may be sent directly to the engine's speed regulator.

By using information about its itinerary, a vehicle's reference speed $v_{ref}$ to the speed regulator can be regulated to cater for saving fuel, enhancing safety and improving comfort. As specialists will appreciate, other reference values to other control systems may also be regulated. The topography greatly affects the control in particular of the power train of heavy vehicles, since much more torque is required to travel uphill than downhill and to travel up steep hills without changing gear.

According to the present invention, reference values can be determined in a computationally efficient way. The module adapted to applying the method according to the invention may also be part of a control system whose reference values it is intended to regulate, but may also be a freestanding module separate from the control system.

The module according to the present invention comprises a mode choice unit adapted to setting a driving mode, e.g. on the basis of input by the vehicle's driver of a suitable mode chosen from at least two selectable modes each comprising a unique set of settings which influence the calculation of the at least one reference value. FIG. 1 depicts the various driving modes as $KM_1$, $KM_2$ $KM_n$. There may therefore be n selectable driving modes for the driver to choose from.

The result is a module which can be implemented in a vehicle to set the calculations of reference values, e.g. reference speeds $v_{ref}$, according to the driver's wishes. He/she makes a mode choice, e.g. by pressing a button, turning a knob, operating a control, making a menu choice, touching a touch screen or effecting some other kind of input, and thereby sets a number of parameters and/or functions by a single input.

There is thus no need for the driver to do various settings separately, since they can be covered jointly by a single mode choice. Since the settings are particularly selected to achieve a desired effect, the driver needs no particular knowledge to be able to set the vehicle so that it is regulated as desired, i.e. so that it is regulated in a way which meets his/her wishes. The module may be part of a control system whose set-point values it is intended to regulate, or be a freestanding module separate from the control system.

According to an embodiment of the present invention, the chosen driving mode defines the lower and upper limit values $v_{min}$ and $v_{max}$. The mode choice thus here defines the width of the range between these limit values. It thereby also defines the limits within which the reference values, e.g. the reference speed $v_{ref}$, are allowed to vary relative to the set speed $v_{set}$.

The mode choice causes the calculation unit to carry out instructions which set the width of the range between the lower and upper limit values $v_{min}$ and $v_{max}$. In this way the range within which the reference values, e.g. the reference speed $v_{ref}$, are allowed to vary can be set, and consequently how fuel-economisingly the vehicle is to be driven. A wide range provides scope for larger fuel savings than a narrower range.

According to an embodiment, the range is asymmetrical relative to the set speed $v_{set}$. According to an embodiment, the larger portion of the range is below the set speed $v_{set}$, making more fuel saving possible, since the reference value is allowed to drop more. According to another embodiment, the larger portion of the range is above the set speed $v_{set}$, making shorter journey times possible, since the reference value is allowed to rise more, which may result in higher average speed.

For example, four different range widths may be defined, e.g. "maximum range width", "medium range width", "minimum range width" and "even range width". The placing of these ranges depends on the set speed $v_{set}$ chosen by the driver. The values for the lower and upper limit values $v_{mm}$ and $v_{max}$ which demarcate the range are related, according to an embodiment, to the set speed $v_{set}$, e.g. as a percentage of it.

According to an embodiment, the values for the lower and upper limit values $v_{min}$ and $v_{max}$ are related to the set speed $v_{set}$ in the form of absolute speed values in km/h. A non-limitative example of such range widths/modes with a set speed of 80 km/h is set out below.

| Speed range | Width range | Example $v_{min}$ | Example $v_{max}$ |
|---|---|---|---|
| Maximum | 13-20 km/h | $v_{set} - 12 = 68$ km/h | $v_{set} + 3 = 83$ km/h |
| Medium | 6-12 km/h | $v_{set} - 8 = 72$ km/h | $v_{set} + 3 = 83$ km/h |
| Minimum | 0-5 km/h | $v_{set} = 80$ km/h | $v_{set} + 5 = 85$ km/h |
| Even | 2-16 km/h | $v_{set} - 5 = 75$ km/h | $v_{set} + 5 = 85$ km/h |

The "maximum range width" might be 13-20 km/h, e.g. −12 and +3 km/h relative to the 80 km/h set speed. The "medium range width" might be 6-12 km/h, e.g. −8 and +3 km/h relative to the set speed. The "minimum range width" might be 0.5 km/h, e.g. 0 and +5 km/h relative to the set speed. The "even range width" might be 2-16 km/h and be evenly split relative to the 80 km/h set speed, e.g. −5 and +5 km/h relative to the set speed $v_{set}$. As specialists will appreciate, these range widths may also assume other values than those exemplified above.

According to an embodiment, the chosen driving mode decides how determining the at least one reference value is to be done. The method for determining, for example, the reference speed $v_{ref}$ is thus controlled by mode choice.

According to an embodiment, the mode choice defines the vehicle's permissible acceleration and/or retardation if the at least one reference value is a reference speed $V_{ref}$. In this case the calculation unit sets on the basis of the mode choice the vehicle's permissible acceleration and retardation, making it possible to choose the amount of comfort desired to the detriment of fuel saving, and vice versa. The comfort criterion thus limits the vehicle's permissible acceleration and/or retardation. By a single input of chosen driving mode the driver can here determine whether comfort or fuel saving is more important at the time, a facility which he/she is likely to regard very positively.

According to an embodiment of the invention, three different settings/modes are defined for acceleration and retardation, as non-limitatively exemplified below.

| Acceleration/retardation | Permissible acceleration/retardation range |
|---|---|
| Maximum | 1-3 m/s² |
| Medium | 0.5-1 m/s² |
| Minimum | 0.02-0.5 m/s² |

"Maximum permissible acceleration and/or retardation" allows acceleration/retardation within the range 1-3 m/s². "Medium permissible acceleration and/or retardation" allows acceleration/retardation within the range 0.5-1 m/s². "Minimum permissible acceleration and/or retardation" allows acceleration/retardation within the range 0.02-0.5 m/s². As specialists will appreciate, the various modes may also have other values than those here exemplified.

According to an embodiment the permissible acceleration/retardation range depends on the vehicle's weight, which means for example that the ranges for the "maximum permissible acceleration and/or retardation" and "medium permissible acceleration and/or retardation" modes will be equal for a heavy vehicle in certain cases, since drag torque or maximum engine torque may respectively subject the vehicle to more than average retardation or acceleration in these cases. There may also be physical limitations which affect range widths.

According to an embodiment of the invention, a desired speed increase or decrease is ramped by applying Torricelli's equation (eq. 1) to calculate the constant acceleration and retardation at which the vehicle is to be driven, provided that this acceleration and/or retardation is permissible. The mode choice here defines the limits for these accelerations and/or retardations, so that desired comfort is achieved.

Torricelli's Equation Reads $$v_{slut}^2 = v_i^2 + 2 \cdot a \cdot s \quad \text{(eq. 1)}$$

in which $v_i$ is the vehicle's initial speed in a route segment, $v_{slut}$ is its speed at the end of the segment, a is the constant acceleration/retardation and s is the length of the segment.

The chosen driving mode may also, according to an embodiment of the invention, define settings in various other systems of the vehicle, e.g. in its automatic gear choice system, cruise control system etc., in which case the calculation unit ensures that these settings are effected in the respective systems.

The various different settings of parameters described above may be given particular values in order to achieve various desired effects in the vehicle. Each driving mode which the driver can choose by input of $KM_1$, $KM_2$ ... $KM_n$ comprises a unique set of settings. Some examples are described below of conceivable driving modes according to various embodiments of the invention, which have different effects depending on the settings covered by the respective mode, which define how the vehicle is to react in different situations. The driving modes are here called Economy, Comfort, Power and Normal. Specialists will appreciate that other names may of course be used for driving modes and that the settings defined for each driving mode are adjustable, e.g. depending on the nature of the vehicle, the driver's personality, etc.

The Economy mode comprises settings which make the vehicle's running behaviour more economical. One such setting defines a maximum range width between the lower and upper limit values $v_{min}$ and $v_{max}$ and/or maximum acceleration and/or retardation, which from a fuel economy perspective are the maximum permissible. Here the weighting parameter β may also be given a value such that the driving mode gives priority to fuel economy. For example, a mean value for maximum permissible acceleration and/or retardation may be defined. A large range width between the lower and upper limit values $v_{min}$ and $v_{max}$ makes it possible to save more fuel on undulating roads with substantial hills by providing more scope for utilising the vehicle's potential energy and kinetic energy on downhill runs.

A driver who chooses Economy mode thus allows larger variations in the vehicle's speed in order to save fuel. According to an embodiment, the speed range is limited between the lower and upper limit values $v_{min}$ and $v_{max}$ so that lowering of speed is only allowed in order to give more priority to fuel saving than to journey time.

In Economy mode, according to an embodiment, the acceleration and/or retardation may also be ramped up and down respectively during accelerations and retardations, which ramping depends on the driving mode chosen.

According to an embodiment, a further lower limit value $v_{min2}$ and a further upper limit value $v_{max2}$ are defined on the basis of the choice of driving mode and are related to a set speed $V_{set}$.

The Comfort driving mode comprises settings which make the vehicle economical without detracting from comfort. For example, a medium range width between the lower and upper limit values $v_{min}$ and $v_{max}$ may be defined, resulting in a narrower range than in Economy mode. Here the weighting parameter β may also be given a value (β=1) which gives fuel and time substantially equal importance. A mean value may also be defined for permissible acceleration and/or retardation, i.e. a value for a in Torricelli's equation (eq. 1), which is lower than the value used in Economy mode. These settings result in greater comfort than in Economy mode.

The Power driving mode comprises settings which make the vehicle's running behaviour more powerful. For example, a minimum range width may be defined between the lower and upper limit values $v_{min}$ and $v_{max}$, resulting in a wider range than in, for example, Economy mode. Here the weighting parameter $\beta$ may also be given a value which prioritises time over fuel. Maximum permissible acceleration and/or retardation may also be defined. A driver who chooses Power mode is assumed to wish to feel the "power" in the vehicle, so less priority is attached to fuel saving than in the other modes. The settings for acceleration and/or retardation depend here on engine performance and/or vehicle weight. In this mode the automatic gear choice system is preferably also set to change gear in hilly terrain, which means the vehicle running at a generally higher engine speed.

The Normal driving mode comprises settings which make the vehicle both economical and comfortable. Here the range width between the lower and upper limit values $v_{min}$ and $v_{max}$ is defined as evenly split relative to the set speed $v_{set}$. In this mode the driver is assumed to desire a combination of both comfort and fuel saving, so the range between the lower and upper limit values $v_{min}$ and $v_{max}$ is set symmetrically relative to the set speed $v_{set}$, e.g. −5 and +5 km about 80 km/h.

According to an embodiment, a set of settings is used which causes the vehicle to achieve shorter journey time without increasing fuel consumption. These settings may for example be incorporated in Power mode or be catered for by a further mode of their own. The weighting parameter $\beta$ and the speed range between the lower and upper limit values $V_{min}$ and $v_{max}$ are then such that priority is given to speed increases before uphill runs, which is advantageous for journey time. The settings are such that the speed is lowered slightly before steep downhill runs, to avoid having to brake downhill.

The settings may be such that the fuel supply is throttled, e.g. when speed lowering is to be effected. Throttling the fuel supply may for example be achieved by lowering the reference speed $v_{ref}$ in such a large step that the engine produces drag torque. The trigger point for fuel injection throttling to begin is here chosen such that desired lowering to a segment entry speed $v_i$ is achieved, where possible. The module's calculation unit here calculates when the fuel injection to the engine is to be throttled, and sends appropriate reference values to the control system when it is time to throttle the fuel supply.

This driving mode may thus define the way in which lowering of speed is to be effected to avoid unnecessary braking. Throttling the fuel supply increases the vehicle's spot speed as compared with ramping its speed down, e.g. by applying Torricelli's equation (eq. 1). Speed increases (acceleration of the vehicle) may be ramped before steep climbs so that the vehicle does not lose as much spot speed uphill as it would by not increasing speed before the climb. Driving the vehicle in this way makes it possible to reduce journey time without increasing fuel consumption. The shorter journey time may also be converted to less fuel consumption by lowering the vehicle's average speed.

According to an embodiment of the invention, the mode choice defines a weighting parameter $\beta$ which is used in evaluating one or more cost functions when determining said at least one reference value.

The cost of at least one out of said first prediction $v_{pred\_Tnew\_ret}$ said second prediction $v_{pred\_Tnew\_acc}$ and a further first prediction $v_{pred\_Tk+new\_ret}$ and a further second prediction $V_{pred\_Tk+new\_acc}$ of the vehicle speed may here be calculated by using at least one cost function $J_{Tnew\_ret}$, $J_{Tnew\_acc}$, $J_{Tk+new\_ret}$, $J_{Tk+new\_acc}$.

According to an embodiment the respective cost functions $J_{Tnew\_ret}$, $J_{Tnew\_acc}$, $J_{Tk+new\_ret}$ and $J_{Tk+new\_acc}$ for said first prediction $v_{pred\_Tk+new\_ret}$, said second prediction $v_{pred\_Tnew\_acc}$, said further first prediction $v_{pred\_Tk+new\_ret}$ and said further second prediction $v_{pred\_Tk+new\_acc}$ of the vehicle speed are determined by weighting their respective energy reductions and journey time reductions relative to a conventional prediction $v_{pred\_cc}$ of the vehicle's speed with a weighting parameter $\beta$.

Said at least one reference value may then be determined on the basis of a cost function comparison of the cost functions $J_{Tnew\_ret}$, $J_{Tnew\_acc}$, $J_{Tk+new\_ret}$ and $J_{Tk+new\_acc}$ for said first prediction $v_{pred\_Tnew\_ret}$ said second prediction $v_{pred\_Tnew\_acc}$, said further first prediction $V_{pred\_Tk+new\_ret}$ and said further second prediction $v_{pred\_Tk+new\_acc}$ to arrive at lowest cost.

The present invention is not restricted to the embodiments described above. Various alternatives, modifications and equivalents may be used. The aforesaid embodiments therefore do not limit the invention's scope which is defined by the attached claims.

The invention claimed is:

1. A vehicle speed regulator module configured to control a speed of a vehicle based on at least one reference value, such that such the at least one reference value differs from a value corresponding to the speed indicated by a driver of the vehicle, the module comprising:
   a mode selection input unit configured to receive a mode choice from at least two selectable driving modes, each driving mode comprising a setting that influences a calculation of the at least one reference value;
   a reference value calculation unit configured:
   to make a first prediction and a second prediction of the speed along an itinerary, said first prediction based on an engine torque which retards the vehicle as compared with the speed regulator in which the reference value equals the speed indicated by the driver, and said second prediction based on an engine torque which accelerates the vehicle as compared with the speed regulator in which the reference value equals the speed indicated by the driver;
   to compare said first prediction and the second prediction, respectively, with a lower limit value and/or an upper limit value, wherein the lower and upper limit values delineate a speed range within which the speed is maintained; and
   to determine the at least one reference value based on the mode choice received and based on at least one of said comparisons and said first prediction and second prediction so that the at least one reference value is within the speed range bounded by the lower and upper limit values; and
   the vehicle speed regulator module configured to regulate the speed of the vehicle based on the at least one reference value determined.

2. The module according to claim 1, wherein the lower and upper limit values and are defined based on the mode choice.

3. The module according to claim 1, wherein a further lower limit value and a further upper limit value are defined based on the mode choice and are related to the speed indicated by the driver.

4. The module according to claim 1, wherein the mode choice decides how said at least one reference value is determined.

5. The module according to claim 1, wherein when said at least one reference value is a reference speed, the mode choice defines a permissible acceleration and/or retardation of the vehicle.

6. The module according to claim 1, wherein the mode choice defines a weighting parameter β which is used in evaluation of one or more cost functions when determining said at least one reference value.

7. The module according to claim 6, wherein the calculation unit is configured to evaluate a cost for at least one of said first prediction, said second prediction and a further first prediction $v_{pred\_Tk+new\_ret}$, and a further second prediction $v_{pred\_Tk+new\_acc}$ of the speed by using at least one cost function $J_{Tnew\_ret}$, $J_{Tnew\_acc}$, $J_{Tk+new\_ret}$, $J_{Tk+new\_acc}$.

8. The module according to claim 7, wherein the calculation unit is configured to determine the respective cost functions $J_{Tnew\_ret}$, $J_{Tnew\_acc}$, $J_{Tk+new\_ret}$ and $J_{Tk+new\_acc}$ for said first prediction, said second prediction, said further first prediction and said further second prediction by weighting with a weighting parameter β their respective energy reductions and journey time reductions relative to a conventional prediction $v_{pred\_cc}$ of the speed.

9. The module according to claim 8, wherein the calculation unit is configured to compare the cost functions $J_{Tnew\_ret}$, $J_{Tnew\_acc}$, $J_{Tk+new\_ret}$ and $J_{Tk+new\_acc}$ for said first prediction, said second prediction, said further first prediction and said further second prediction,
wherein said at least one reference value is determined based on the comparison to arrive at lowest cost.

10. A vehicle comprising the module of claim 1.

11. A method of determining at least one reference value for a speed regulator that controls a speed of a vehicle such that said reference value that differs from a value corresponding to the speed indicated by a driver of the vehicle, the method comprising:
receiving a mode choice from at least two selectable driving modes, each mode choice comprising a setting that influences calculation of the at least one reference value;
making a first prediction and a second prediction of the speed along an itinerary, said first prediction based on an engine torque which retards the vehicle as compared with speed regulator in which the reference value equals the speed indicated by the driver, and said second prediction based on an engine torque which accelerates the vehicle as compared with the speed regulator in which the reference value equals the speed indicated by the driver;
comparing said first prediction and second prediction, respectively, with a lower limit value and/or an upper limit value, wherein the lower limit value and the upper limit value delineate a speed range within which the speed of the vehicle is maintained;
determining, by an automated digital processor circuit, the at least one reference value based on said mode choice and on at least one of said comparisons and said first prediction and second prediction so that the at least one reference value is within the speed range bounded by the lower and upper limit values; and
outputting the at least one reference value determined to a vehicle control system for controlling the speed of the vehicle.

12. The method according to claim 11, wherein the lower and upper limit values are defined based on the mode choice.

13. The method according to claim 11, wherein a further lower limit value and a further upper limit value are defined based on the mode choice and are related to the speed indicated by the driver.

14. The method according to claim 11, wherein the mode choice decides how said at least one reference value is determined.

15. The method according to claim 11, wherein when said at least one reference value is a reference speed, and the mode choice defines a permissible acceleration and/or retardation of the vehicle.

16. The method according to claim 11, wherein the method further comprises:
using at least one cost function for the determining of the at least one reference value; and
evaluating the at least one cost function based on a weighting parameter β defined according to the mode choice.

17. The method according to claim 16, wherein the method further comprises:
using a cost function for the determining of said at least one reference value, the cost function evaluating a cost for at least one of said first prediction, said second prediction and a further first prediction $v_{pred\_Tk+new\_ret}$, and a further second prediction $v_{pred\_Tk+new\_acc}$ of the speed,
wherein the at least one cost function is at least one cost function of the cost functions $J_{Tnew\_ret}$, $J_{Tnew\_acc}$, $J_{Tk+new\_ret}$, $J_{Tk+new\_acc}$.

18. The method according to claim 17, wherein the cost functions $J_{Tnew\_ret}$, $J_{Tnew\_acc}$, $J_{Tk+new\_ret}$ and $J_{Tk+new\_acc}$ for said first prediction, said second prediction, said further first prediction and said further second prediction are determined by weighting with a weighting parameter β their respective energy reductions and journey time reductions relative to a conventional prediction $v_{pred\_cc}$ of the speed.

19. The method according to claim 18, wherein the method further comprises:
comparing the cost functions $J_{Tnew\_ret}$, $J_{Tnew\_acc}$, $J_{Tk+new\_ret}$ and $J_{Tk+new\_acc}$ for said first prediction, said second prediction and said further first prediction, said further second prediction,
wherein the determining of said at least one reference value is based on the said comparing to arrive at lowest cost.

20. A non-transitory computer-readable medium incorporating instructions configured, when the instructions are run on a computer, to regulate a speed of a vehicle based on at least one reference value that differs from a value corresponding to the speed indicated by a driver of the vehicle, by performing steps including:
receiving a mode choice from at least two selectable driving modes, each mode choice comprising a setting that influences calculation of the at least one reference value;
making a first prediction and a second prediction of the speed along an itinerary, said first prediction based on an engine torque which retards the vehicle as compared with speed regulator in which the reference value equals the speed indicated by the driver, and said second prediction based on an engine torque which accelerates the vehicle as compared with the speed regulator in which the reference value equals the speed indicated by the driver;
comparing said first prediction and second prediction, respectively, with a lower limit value and/or an upper limit value, wherein the lower limit value and the upper limit value delineate a speed range within which the speed of the vehicle is maintained;
determining, by an automated digital processor circuit, the at least one reference value based on said mode choice and on at least one of said comparisons and said first prediction and second prediction so that the at least one reference value is within the speed range bounded by the lower and upper limit values; and
regulating the speed of the vehicle based on the at least one reference value determined.

\* \* \* \* \*